United States Patent
Bryant et al.

(10) Patent No.: US 11,168,830 B2
(45) Date of Patent: Nov. 9, 2021

(54) REST FOR SUPPORTING AN OBJECT

(71) Applicant: Spartan Precision Equipment Ltd., East Sussex (GB)

(72) Inventors: David Bryant, Crawley (GB); Robert Gearing, East Sussex (GB); Simon Jeffs, Berkshire (GB)

(73) Assignee: Spartan Precision Equipment Ltd., East Sussex (GB)

( * ) Notice: Subject to any disclaimer, the term of this patent is extended or adjusted under 35 U.S.C. 154(b) by 133 days.

(21) Appl. No.: 14/419,258

(22) PCT Filed: Aug. 5, 2013

(86) PCT No.: PCT/GB2013/000330
§ 371 (c)(1),
(2) Date: Feb. 3, 2015

(87) PCT Pub. No.: WO2014/020296
PCT Pub. Date: Feb. 6, 2014

(65) Prior Publication Data
US 2015/0204479 A1 Jul. 23, 2015

(30) Foreign Application Priority Data
Aug. 3, 2012 (GB) .................................... 1213860

(51) Int. Cl.
*F16M 11/16* (2006.01)
*F16M 11/26* (2006.01)
(Continued)

(52) U.S. Cl.
CPC ........... *F16M 11/16* (2013.01); *F16M 11/041* (2013.01); *F16M 11/10* (2013.01);
(Continued)

(58) Field of Classification Search
CPC ...... H04N 5/232; H04N 5/2252; F16M 11/16; F16M 11/041; F16M 11/10; F16M 11/12;
(Continued)

(56) References Cited

U.S. PATENT DOCUMENTS 3,041,938 A 7/1962 Seabrook
3,286,212 A 11/1966 Thompson et al.
(Continued)

FOREIGN PATENT DOCUMENTS

CN 2212183 Y 11/1995
CN 201 100 511 Y 8/2008
(Continued)

OTHER PUBLICATIONS

International Search Report for corresponding patent application No. PCT/GB2013/000330 dated Dec. 6, 2013.

*Primary Examiner* — Antoinette T Spinks
(74) *Attorney, Agent, or Firm* — Osha Bergman Watanabe & Burton LLP

(57) ABSTRACT

A rest for supporting an object, the rest comprising: a rest fixture (5) which is in use attached to an object, wherein the rest fixture comprises a stand coupling (67) which includes a magnetic element (69) for removable attachment of a rest stand; and a rest stand for resting on a surface, wherein the rest stand comprises a support body (11), at least one leg (15) which is supported by the support body and a fixture coupling (17) which includes a magnetic element (51) for removable attachment to the stand coupling on the object.

16 Claims, 7 Drawing Sheets

(51) Int. Cl.

| | |
|---|---|
| F16M 11/28 | (2006.01) |
| F16M 11/32 | (2006.01) |
| F41A 23/06 | (2006.01) |
| F16M 11/10 | (2006.01) |
| F16M 11/04 | (2006.01) |
| F41A 23/14 | (2006.01) |
| F41A 23/10 | (2006.01) |
| F16M 11/12 | (2006.01) |
| F41A 23/02 | (2006.01) |
| G02B 7/02 | (2021.01) |
| G02B 23/16 | (2006.01) |
| G02B 23/18 | (2006.01) |
| H04N 5/225 | (2006.01) |

(52) U.S. Cl.
CPC ............. *F16M 11/12* (2013.01); *F16M 11/26* (2013.01); *F16M 11/28* (2013.01); *F16M 11/32* (2013.01); *F41A 23/02* (2013.01); *F41A 23/06* (2013.01); *F41A 23/10* (2013.01); *F41A 23/14* (2013.01); *G02B 7/02* (2013.01); *G02B 23/16* (2013.01); *G02B 23/18* (2013.01); *H04N 5/2252* (2013.01)

(58) Field of Classification Search
CPC ........ F16M 11/26; F16M 11/28; F16M 11/32; F41A 23/02; F41A 23/06; F41A 23/10; F41A 23/14; G02B 7/02; G02B 23/16; G02B 23/18
USPC ........................................................ 348/375
See application file for complete search history.

(56) References Cited

U.S. PATENT DOCUMENTS

| | | |
|---|---|---|
| 3,810,647 A | 5/1974 | Martchenke |
| 6,042,080 A | 3/2000 | Shepherd et al. |
| 7,779,572 B2 * | 8/2010 | Potterfield .............. F41A 23/10 42/94 |
| 7,954,272 B2 * | 6/2011 | Potterfield .............. F41A 23/10 42/94 |
| 8,187,006 B2 * | 5/2012 | Rudisill ................. H01R 11/30 362/249.06 |
| 2004/0118985 A1 | 6/2004 | Omps |
| 2006/0139134 A1 * | 6/2006 | Hunts ................... H01F 7/0242 335/205 |
| 2008/0011344 A1 | 1/2008 | Barker |
| 2008/0156948 A1 | 7/2008 | Cameron et al. |
| 2009/0056192 A1 | 3/2009 | Oz |
| 2009/0057503 A1 | 3/2009 | Hou |
| 2009/0074531 A1 * | 3/2009 | Schmidt ................... B66D 1/04 410/103 |
| 2009/0249674 A1 * | 10/2009 | Boord .................... F16M 13/04 42/94 |
| 2010/0237206 A1 | 9/2010 | Barker |
| 2010/0254697 A1 * | 10/2010 | Johnson ................. F16M 11/02 396/428 |
| 2011/0235346 A1 | 8/2011 | Fridley |
| 2011/0235246 A1 | 9/2011 | Liao et al. |
| 2013/0113584 A1 * | 5/2013 | Hunts ................... H01F 7/0242 335/285 |
| 2013/0174463 A1 * | 7/2013 | Hinds ..................... F41A 23/04 42/94 |
| 2014/0130393 A1 * | 5/2014 | Antell ..................... F41A 23/10 42/94 |
| 2021/0063107 A1 * | 3/2021 | Favory .................... F41A 23/10 |

FOREIGN PATENT DOCUMENTS

| | | |
|---|---|---|
| CN | 204062410 U | 12/2014 |
| CN | 204176265 U | 2/2015 |
| DE | 102007047530 A1 | 4/2009 |
| WO | 2005/068894 A1 | 7/2005 |

* cited by examiner

REST FOR SUPPORTING AN OBJECT

This application is a national phase of International Application No. PCT/GB2013/000330 filed Aug. 5, 2013 which claims priority to GB Application No. 1213860.8 filed Aug. 3, 2015, and published in the English language.

The present invention relates to a rest for supporting an object, and more particularly to a rest which is in use attached to an object, for example, a rifle, a camera, a scope, a monocular or binoculars.

Rests, including bi-pod rests, are available for objects such as rifles, cameras, scopes, monoculars or binoculars, but these tend to be bulky and, furthermore, require permanent fixture to the object, meaning that each object has to be fitted with its own rest.

It is an aim of the present invention to provide an improved rest which is both relatively lightweight and easily removable to allow for interchangeable use with multiple objects.

In one aspect the present invention provides a rest for supporting an object, the rest comprising: a rest fixture which is in use attached to an object, wherein the rest fixture comprises a stand coupling which includes a magnetic element for removable attachment of a rest stand; and a rest stand for resting on a surface, wherein the rest stand comprises a support body, at least one leg which is supported by the support body and a fixture coupling which includes a magnetic element for removable attachment to the stand coupling on the object.

In another aspect the present invention provides a rest stand for attachment to an object and resting on a surface, wherein the rest stand comprises a support body, at least one leg which is supported by the support body and a fixture coupling which includes a magnetic element for removable attachment to a stand coupling on the object.

In a further aspect the present invention provides a rest fixture which is in use attached to an object and provides for removable attachment of a rest stand, wherein the rest fixture comprises a stand coupling which includes a magnetic element for removable attachment of a rest stand.

In one embodiment the object is a rifle.

In another embodiment the object is a camera.

In a further embodiment the object is a scope.

In a still further embodiment the object is a monocular or binoculars.

In one embodiment the stand comprises two legs.

In another embodiment the stand comprises three legs.

In one embodiment each leg comprises at least one leg element and a foot.

In one embodiment each leg comprises a plurality of leg elements, which allows for the legs to have different lengths.

In one embodiment the leg elements are connected by a screw or magnetic coupling.

In another embodiment the leg elements are telescopic or continuously extendable.

In one embodiment each leg is comprised of composite materials.

In one embodiment each foot is connected to the respective leg element by a screw or magnetic coupling.

In one embodiment each foot includes a removable cap.

In one embodiment the legs are each pivotably coupled to the support body about a respective pivot between a first, expanded or in use configuration and a collapsed configuration.

In one embodiment the legs each include a pivot connector at one, upper end thereof which is pivotably coupled to the support body.

In one embodiment the support body includes first and second magnetic elements, each adjacent and to a respective outer side of one the pivots, and the pivot connectors each include a magnetic element, whereby the magnetic element of the respective leg is attracted to the respective magnetic element of the support body, thereby maintaining the legs in the expanded, in use configuration during use.

In one embodiment the magnetic element of the fixture coupling comprises a magnet.

In one embodiment the magnetic element of the fixture coupling is provided as a magnet pair which is located to opposite sides of an axis of rotation of the stand.

In one embodiment the fixture coupling and/or the stand coupling each comprise circular or near-circular sections.

In one embodiment the rest fixture further comprises an attachment body which is in use fixed to the object.

In one embodiment the attachment body comprises a plate which is attached by a fixing to the object.

In one embodiment the attachment body includes an aperture through which the fixing is made to the object.

In one embodiment the rest fixture is integrated into the object.

In one embodiment the fixture coupling on the rest stand comprises one of a male projection or coupling or a female recess or coupling and/or the stand coupling on the fixture comprises the other of a female recess or coupling or a male projection or coupling.

In one embodiment the male projection or coupling or the female recess or coupling presents a part-spherical surface.

In one embodiment the male projection or coupling and the female recess or coupling present part-spherical surfaces.

In yet another aspect the present invention provides a rifle rest, comprising: a rifle fixture which is in use attached to a rifle, wherein the rifle fixture comprises a stand coupling which includes a magnetic element for removable attachment of a rest stand; and a rest stand for resting on a surface, wherein the rest stand comprises a support body, first and second legs which are supported by the support body and a rifle coupling which includes a magnetic element for removable attachment to the stand coupling on the rifle.

The present invention also extends to an object, for example, a rifle, a camera, a scope, a monocular or a pair of binoculars, including the above-described rest, the above-described rest stand or the above-described fixture.

Preferred embodiments of the present invention will now be described hereinbelow by way of example only with reference to the accompanying drawings, in which.

Figure 1:
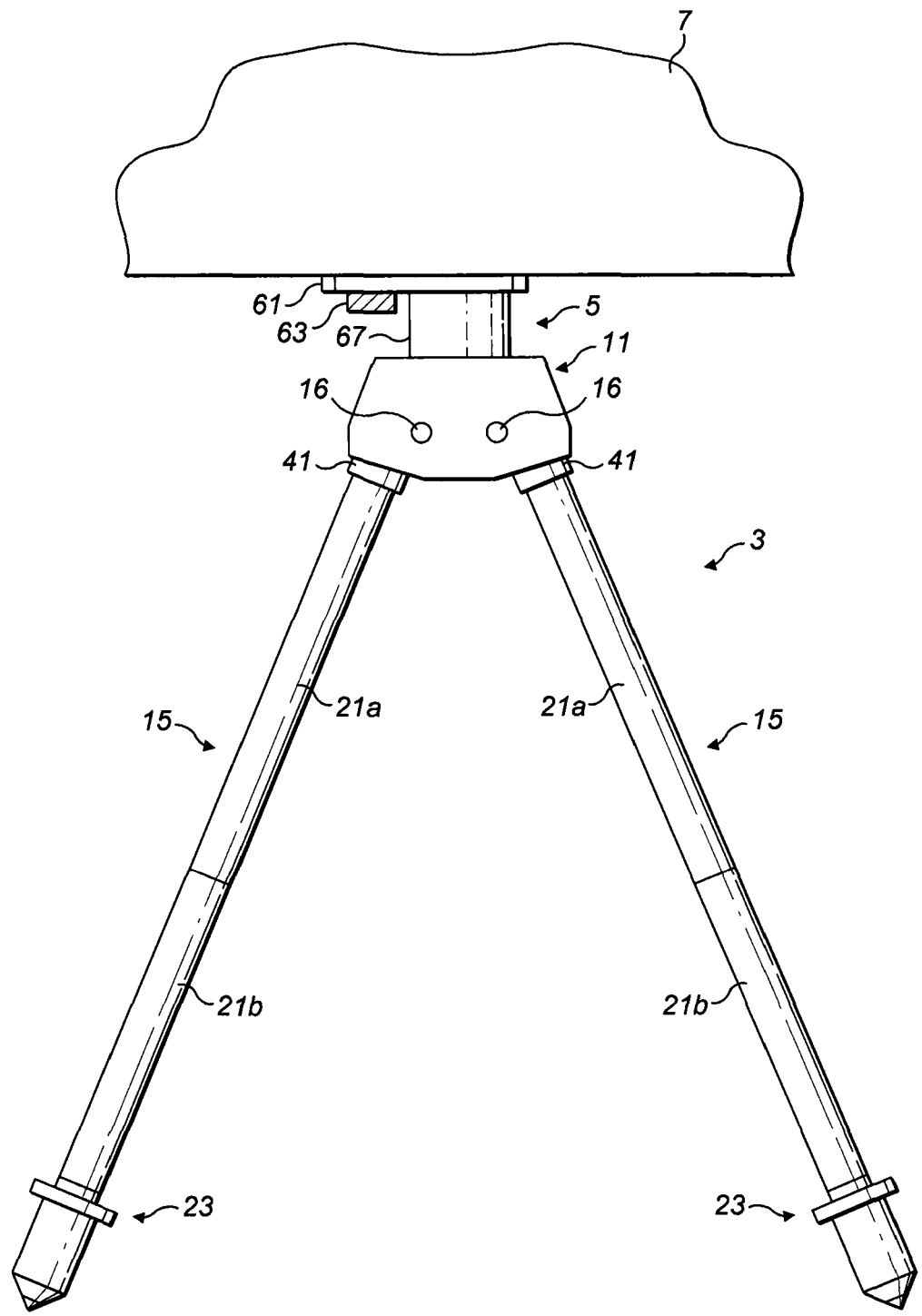
FIG. 1 illustrates an elevational view of a rest, in this embodiment a bi-pod rifle rest, in accordance with a first embodiment of the present invention in an expanded, in use configuration.
Figure 7A:
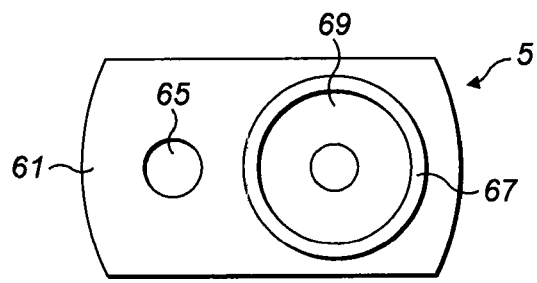
Figure 7B:
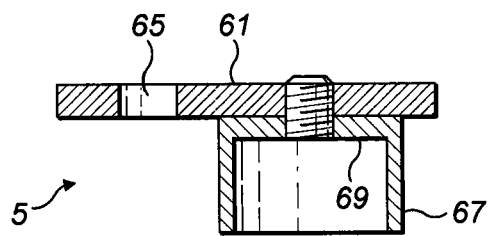
Figure 8:
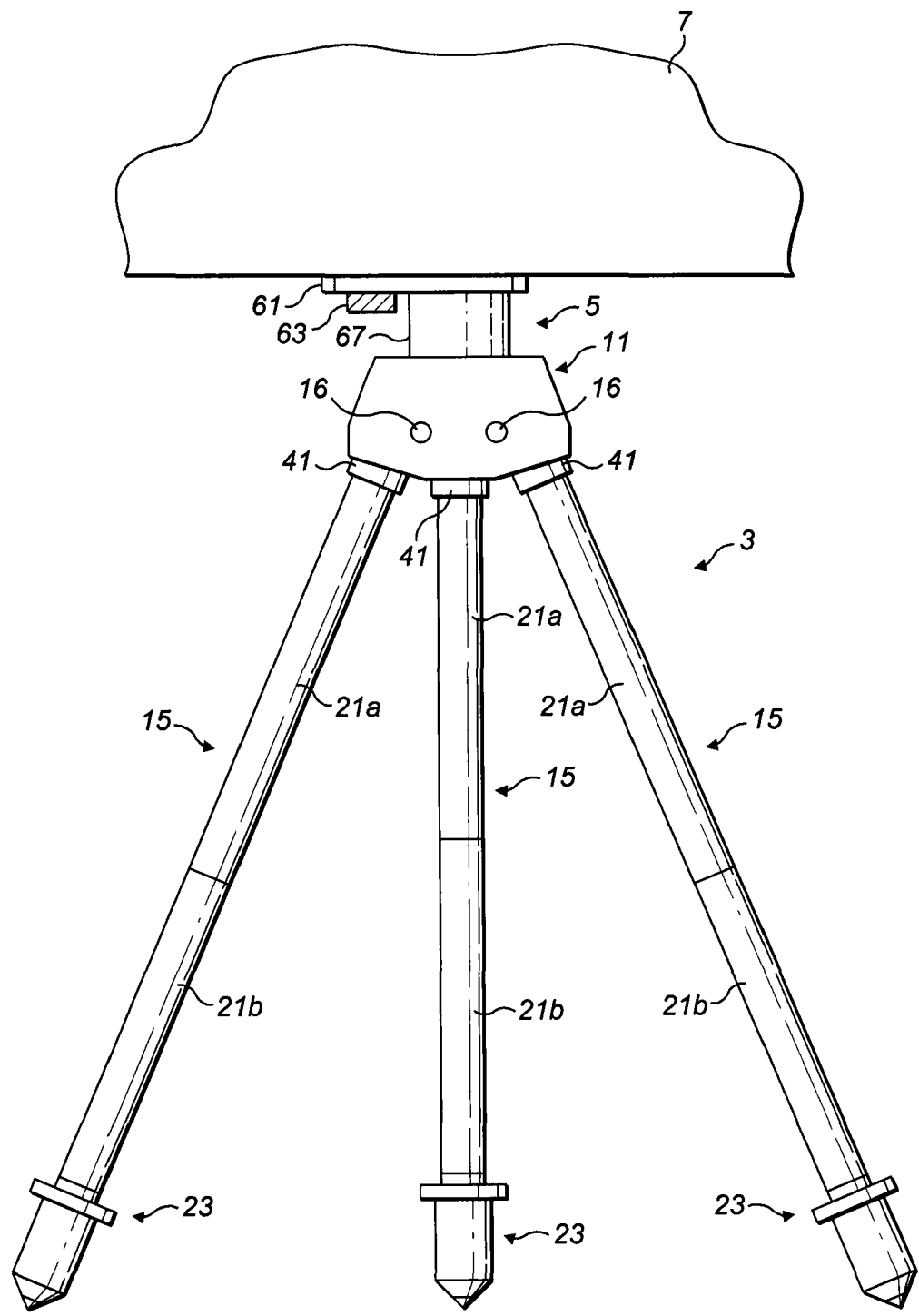
Figure 9:
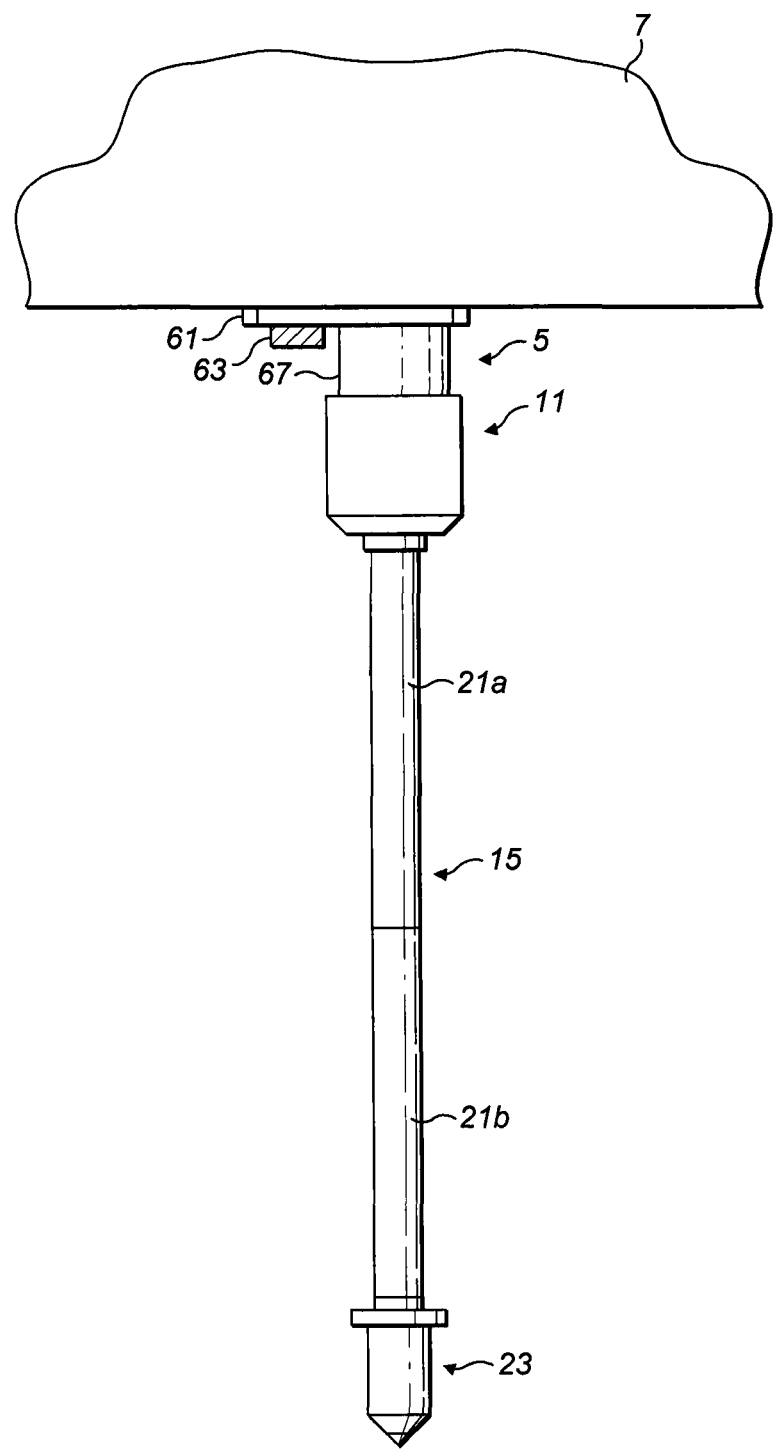
Figure 10:
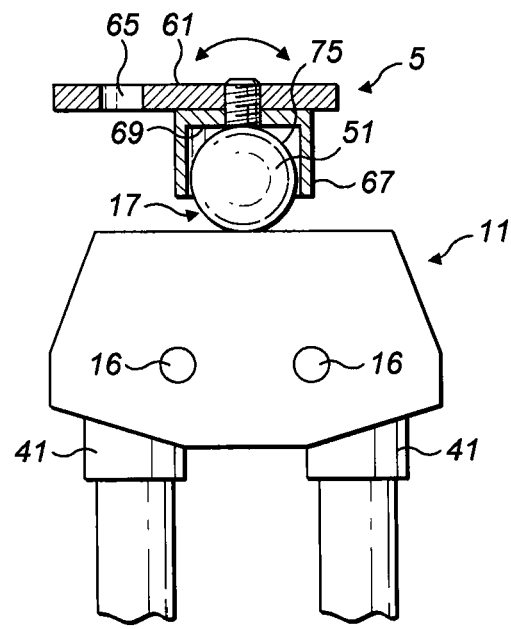
Figure 11:
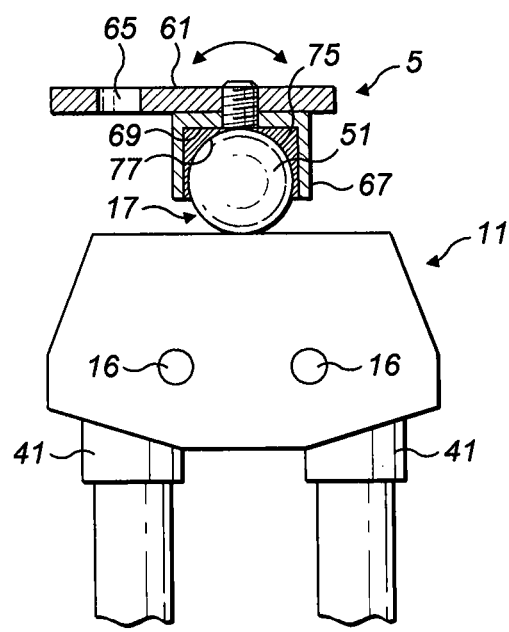

FIGS. 7(*a*) and (*b*) illustrate plan and longitudinal sectional views of the rifle fixture of the rifle rest of FIG. 1;

FIG. 8 illustrates an elevational view of a rest, in this embodiment a tri-pod rifle rest, in accordance with a second embodiment of the present invention in an expanded, in use configuration;

FIG. 9 illustrates an elevational view of a rest, in this embodiment a uni-pod rifle rest, in accordance with a third embodiment of the present invention;

FIG. 10 illustrates an elevational view of a rest, in this embodiment a uni-pod rifle rest, in accordance with a fourth embodiment of the present invention; and FIG. 11 illustrates an elevational view of a rest, in this embodiment a uni-pod rifle rest, in accordance with a fifth embodiment of the present invention.

FIGS. 1 to 7 illustrates a rest, in this embodiment a bi-pod rifle rest, in accordance with a first embodiment of the present invention.

The bi-pod rifle rest comprises a stand 3 which rests on a surface, such as the ground if prone or a raised object if kneeling or standing, and a rifle fixture 5 which is attached to a rifle 7 and removably receives the stand 3.

The stand 3 comprises a support body 11, first and second legs 15 which are supported by the support body 11 and a rifle coupling 17 which is removably attachable to the rifle fixture 5 on the rifle 7.

Figure 2:
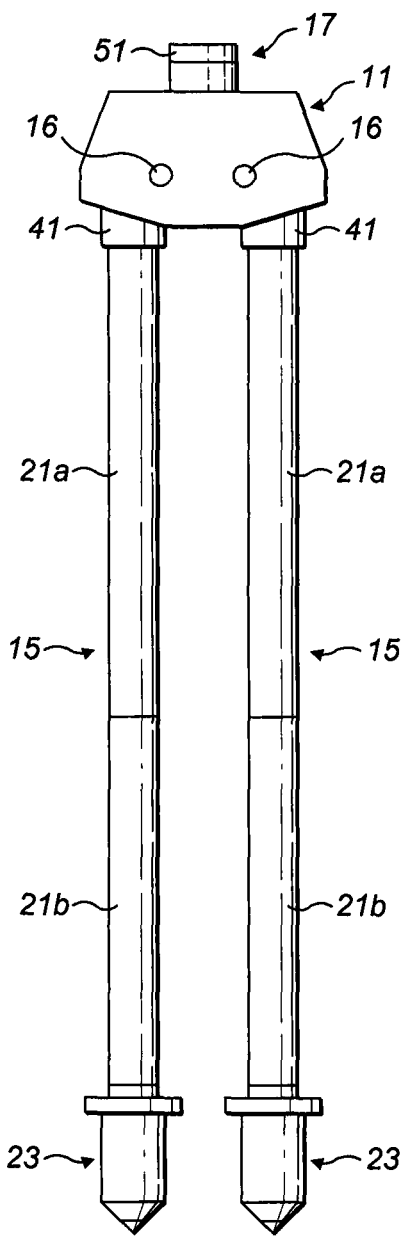
FIG. 2 illustrates a front elevational view of the stand of the rifle rest of FIG. 1 in a collapsed or rest configuration.
Figure 3:
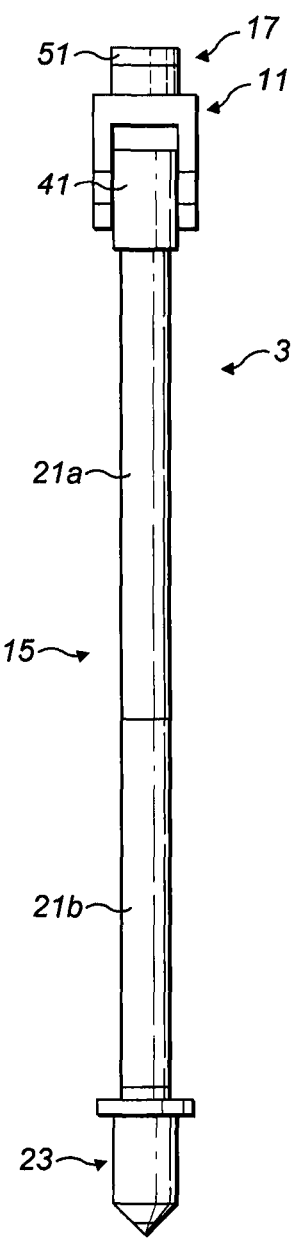
FIG. 3 illustrates a side elevational view of the stand of FIG. 2.

In this embodiment the legs 15 are each pivotably coupled to the support body 11 about a respective pivot 16 between a first, expanded or in use configuration, as illustrated in FIG. 1, and a collapsed configuration, as illustrated in FIG. 2. By allowing for collapsing of the legs 15, the rifle rest allows for compact storage.

In this embodiment each leg 15 comprises at least one leg element 21a, b and a foot 23.

In this embodiment each leg 15 comprises a plurality of leg elements 21a, b, which allow for extension of the leg 15 to have different lengths.

Figure 4:
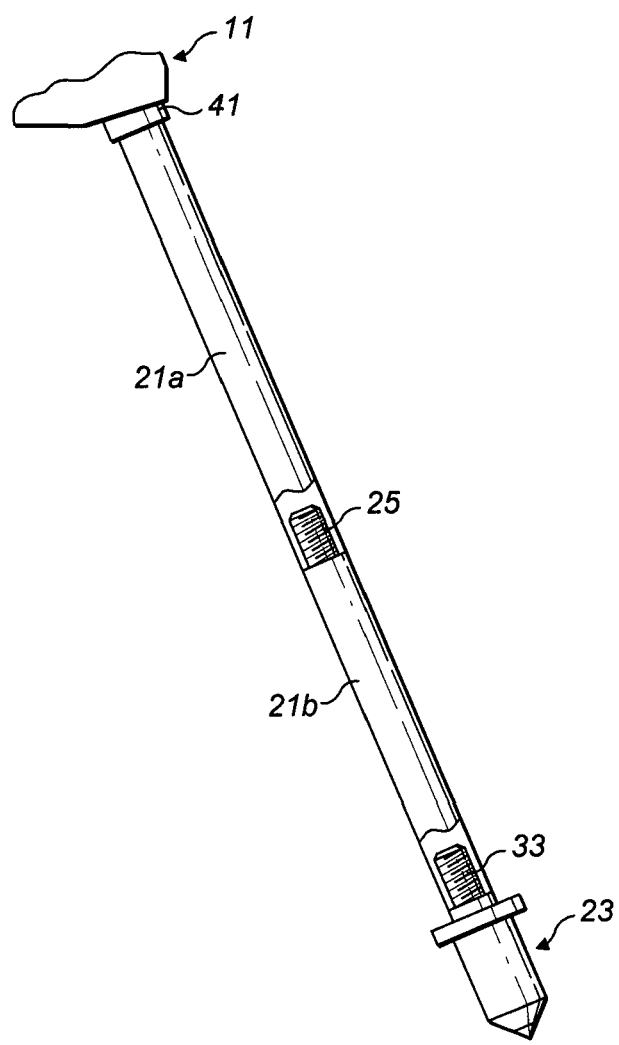
FIG. 4 illustrates a cut-away, part-sectional view of one leg of the stand of FIG. 2.

In this embodiment, as illustrated in FIG. 4, the leg elements 21a, b are connected by a screw coupling 25. In another embodiment the leg elements 21a, b could be coupled by a magnetic coupling.

In an alternative embodiment each leg 15 could be continuously extendable, such as by a telescopic arrangement.

In this embodiment each leg 15 is formed of mild steel. In one embodiment each leg 15 is formed of aluminium alloy. In another embodiment each leg 15 could be formed of composite materials.

In this embodiment each foot 23 has a spike or point, in order to allow for stable resting on a surface.

Figure 5:
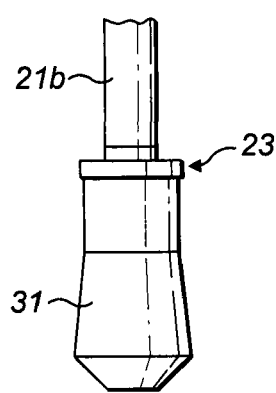
FIG. 5 illustrates a cap on the foot of one leg of the stand of FIG. 2.
Figure 6:
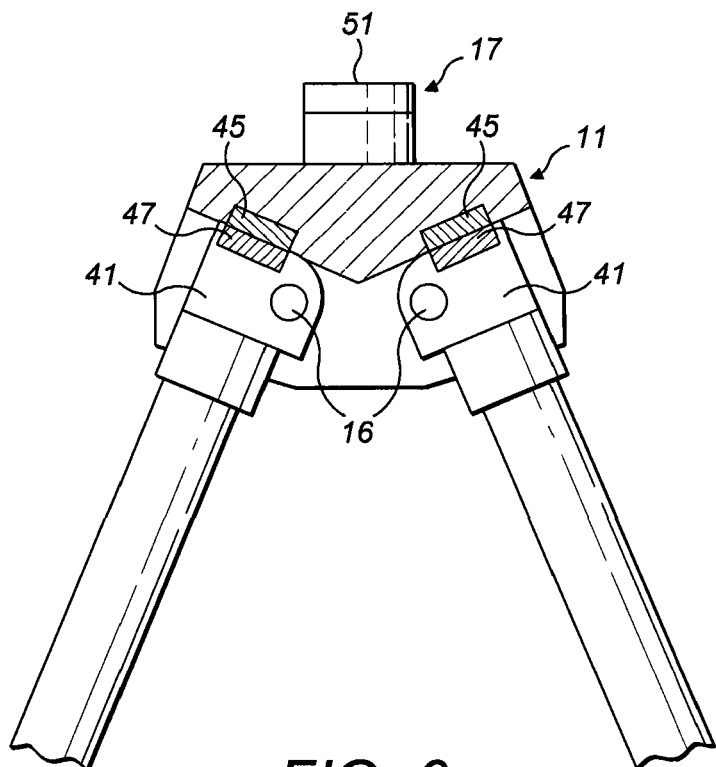
FIG. 6 illustrates a cut-away, part-sectional view of the coupling of the support body and the legs of the stand of FIG. 2.

As illustrated in FIG. 5, in this embodiment the feet 23 each include a cap 31, which serves to protect a user from the spike on the foot 23 and, where formed of a resilient material, such as a rubberized material, also can provide for a more secure fixing on a relatively-flat or polished surface.

In this embodiment, as illustrated in FIG. 4, the feet 23 are each connected to the respective leg element 21a, b by a screw coupling 33. In another embodiment the feet 23 could be connected to the respective leg element 21a, b by a magnetic coupling.

In this embodiment the legs 15 each include a pivot connector 41 at one, the upper, end thereof which is pivotably coupled to the support body 11.

In this embodiment the support body 11 includes first and second magnetic elements 45, each adjacent and to a respective outer side of one the pivots 16, and the pivot couplings 41 of the legs 15 each include a magnetic element 47, such that the magnetic element 47 of the respective leg 15 is attracted to the respective magnetic element 45 of the support body 11, thereby maintaining the legs 15 in the expanded, in use configuration during use.

The rifle coupling 17 comprises a magnetic element 51 which attracts or is attracted to a counterpart magnetic element 69 of the rifle fixture 5, as will be described in more detail hereinbelow.

In one embodiment the magnetic element 51 comprises a magnet, here provided as a magnet pair which is located to opposite sides of the axis of rotation of the stand 3. This arrangement has been found advantageously to facilitate smooth rotation of the rifle fixture 5, and hence the rifle 7, relative to the stand 3.

In this embodiment the magnet is formed of a Neodynium-based material.

In this embodiment the rifle coupling 17 comprises has a circular or near-circular section, which allows for rotation of the rifle fixture 5, and hence the rifle 7, thereabout, allowing for smooth rotation of the rifle 7 about the stand 3 when planted on a surface.

The rifle fixture 5 comprises an attachment body 61 which is fixed to the rifle 7. In this embodiment the attachment body 61 comprises a plate which is attached by a fixing 63 to the rifle 7. In this embodiment the attachment body 61 includes an aperture 65 through which the fixing 63, here a screw fixing, is made to the rifle 7.

The rifle fixture 5 further comprises a stand coupling 67 which is connected to the attachment body 61 and to which the rifle coupling 17 on the stand 3 is fixed.

In this embodiment the stand coupling 17 comprises a magnetic element 69 which attracts or is attracted to the counterpart magnetic element 51 of the rifle coupling 17 of the stand 3, as described hereinabove.

In this embodiment the stand coupling 67 comprises has a circular or near-circular section, which allows for rotation of the stand 3 thereto, allowing for smooth rotation of the rifle 7 about the stand 3 when planted on a surface.

In this embodiment the rifle fixture 5 is formed of mild steel.

In this embodiment the rifle coupling 17 on the stand 3 comprises a male projection or coupling 17 and the stand coupling 67 on the rifle fixture 5 comprises a female recess or coupling 67 which receives the male projection or coupling 17 of the stand 3. In an alternative embodiment the rifle coupling 17 on the stand 3 could comprise a female recess or coupling and the stand coupling 67 on the rifle fixture 5 could comprise a male projection or coupling 67 which would be received by the female recess or coupling 17 of the stand 3. In one embodiment the male projection or coupling and the female recess or coupling comprise part-spherical surfaces, for example so as to form a ball-and-socket-type connection between the rifle coupling 17 and the stand coupling 67.

FIG. 8 illustrates a rest in accordance with a second embodiment of the present invention.

The rest of this embodiment is very similar to the rest of the above-described embodiment, and thus, in order to avoid unnecessary duplication of description, only the differences will be described in detail, with like parts being designated by like reference signs.

This embodiment differs from the first-described embodiment in comprising a third leg 15, and providing a tri-pod rest.

FIG. 9 illustrates a rest in accordance with a third embodiment of the present invention.

The rest of this embodiment is quite similar to the rest of the first-described embodiment, and thus, in order to avoid unnecessary duplication of description, only the differences will be described in detail, with like parts being designated by like reference signs.

This embodiment differs from the first-described embodiment in comprising only a single leg 15, and providing a uni-pod rest. In this embodiment the pivot coupling 41 is omitted and the leg 15 is fixed to the support body 11.

FIG. 10 illustrates a rest in accordance with a fourth embodiment of the present invention.

The rest of this embodiment is very similar to the rest of the above-described first embodiment, and thus, in order to avoid unnecessary duplication of description, only the differences will be described in detail, with like parts being designated by like reference signs.

This embodiment differs from the first-described embodiment in that the magnetic element 51 of the coupling 17 presents a part-spherical surface 75 to the magnetic element 69 of the rest fixture 5, which allows for rotation of the supported object about a horizontal axis.

FIG. 11 illustrates a rest in accordance with a fifth embodiment of the present invention.

The rest of this embodiment is very similar to the rest of the above-described fourth embodiment, and thus, in order to avoid unnecessary duplication of description, only the differences will be described in detail, with like parts being designated by like reference signs.

This embodiment differs from the fourth-described embodiment in that the magnetic element 51 of the coupling 17 presents a part-spherical surface 75, here a convex surface, but could alternatively be concave, to the magnetic element 69 of the rest fixture 5, and the magnetic element 69 of the rest fixture 5 presents a part-spherical surface 77, here a concave surface, but could alternatively be convex, which allows for rotation of the supported object about a horizontal axis.

Finally, it will be understood that the present invention has been described in its preferred embodiments and can be modified in many different ways without departing from the scope of the invention as defined by the appended claims.

For example, component parts of the above-described rests and the rest stands 3 and rest fixtures 5 thereof could be formed at least in part of composite materials.

The invention claimed is:

1. A rifle rest for supporting a rifle, the rifle rest comprising:
   a rest fixture which is in use attached to the rifle, wherein the rest fixture comprises a stand coupling which includes a magnetic element for removable attachment of a rest stand; and
   a rest stand for resting on a surface, wherein the rest stand comprises a support body, at least two legs which are supported by the support body and a fixture coupling which includes a magnetic element for removable attachment to the stand coupling on the rifle;
   wherein the fixture coupling and the stand coupling each comprise circular or near-circular sections mated about a flat plane, which provide for smooth, substantially planar rotation of the fixture coupling in relation to the stand coupling around a vertical axis without relative separation of the magnetic element in the stand coupling and the magnetic element in the fixture coupling and also allows for rotation of the rifle about a horizontal axis.

2. The rifle rest of claim 1, wherein each of the at least two legs comprises at least one leg element and a foot, each leg comprises a plurality of leg elements, which allows for the legs to have different lengths, the leg elements are connected by a screw or magnetic coupling, the leg elements are telescopic or continuously extendable, each foot is connected to the respective leg element by a screw or magnetic coupling, each foot includes a removable cap.

3. The rest of claim 1, wherein the magnetic element of the fixture coupling comprises a magnet, optionally the magnetic element of the fixture coupling is provided as a magnet pair which is located to opposite sides of an axis of rotation of the stand.

4. The rifle rest of claim 1, wherein the rest fixture further comprises an attachment body which is in use fixed to the rifle, the attachment body comprises a plate which is attached by a fixing to the rifle, the attachment body includes an aperture through which the fixing is made to the rifle.

5. The rifle rest of claim 1, wherein the at least two legs are each pivotably coupled to the support body about a respective pivot between a first, expanded or in use configuration and a collapsed configuration, the at least two legs each include a pivot connector at one, upper end thereof which is pivotably coupled to the support body, the support body includes first and second magnetic elements, each adjacent and to a respective outer side of one the pivots, and the pivot connectors each include a magnetic element, whereby the magnetic element of the respective leg is attracted to the respective magnetic element of the support body, thereby maintaining the legs in the expanded, in use configuration during use.

6. The rifle rest of claim 1, wherein the smooth rotation is provided for greater than 30 degrees of rotation around the vertical axis.

7. The rifle rest of claim 6, wherein the smooth rotation is provided for 360 degrees of rotation around the vertical axis.

8. The rifle rest of claim 1, wherein the smooth, planar rotation is non-undulating.

9. The rifle rest of claim 1, wherein the rifle rest is capable of attaching to one or more selected from the group consisting of a camera, a monocular, and a binocular, when the rifle is not attached.

10. A rifle rest for supporting a rifle, the rifle rest consisting of:
    a rest fixture which is in use attached to the rifle, wherein the rest fixture comprises a stand coupling which includes a magnetic element for removable attachment of a rest stand; and
    a rest stand for resting on a surface, wherein the rest stand comprises a support body, two legs which are directly coupled to the support body and a fixture coupling which includes a magnetic element for removable attachment to the stand coupling on the rifle;
    wherein the two legs are each pivotably coupled to the support body about a respective pivot between a first, expanded or in use configuration and a collapsed configuration, each of the two legs includes a pivot connector at one, upper end thereof which is pivotably coupled to the support body, the support body includes first and second magnetic elements, each adjacent and to a respective outer side of one the pivots, and the pivot connectors each include a magnetic element, whereby the magnetic element of the respective leg is attracted to the respective magnetic element of the support body, thereby maintaining the legs in the expanded, in use configuration during use; and
    wherein the fixture coupling and the stand coupling each comprise circular or near-circular sections mated about a flat plane, which provide for smooth, substantially planar rotation of the fixture coupling in relation to the stand coupling around a vertical axis and also allows for rotation of the rifle about a horizontal axis.

11. A rest stand for attachment to a rifle and resting on a surface, the rest stand consisting of:
a support body,
two legs which are supported by the support body, and
a fixture coupling which includes a cylindrical, magnetic element for removable attachment to a stand coupling on the rifle,
wherein the fixture coupling comprises a circular or near-circular section of the cylindrical, magnetic element mated about a flat plane, which provide for smooth, substantially planar rotation of the fixture coupling in relation to the stand coupling around a vertical axis without relative separation of the magnetic element in the stand coupling and the magnetic element in the fixture coupling and also allows for rotation of the rifle about a horizontal axis.

12. The rest stand of claim 11, wherein each of the two legs comprises at least one leg element and a foot, each leg comprises a plurality of leg elements, which allows for the legs to have different lengths, the leg elements are connected by a screw or magnetic coupling, the leg elements are telescopic or continuously extendable, each foot is connected to the respective leg element by a screw or magnetic coupling, each foot includes a removable cap.

13. The rest stand of claim 11, wherein the two legs are each pivotably coupled to the support body about a respective pivot between a first, expanded or in use configuration and a collapsed configuration, the two legs each include a pivot connector at one, upper end thereof which is pivotably coupled to the support body, the support body includes first and second magnetic elements, each adjacent and to a respective outer side of one the pivots, and the pivot connectors each include a magnetic element, whereby the magnetic element of the pivot connector of the respective leg is attracted to the respective magnetic element of the support body, thereby maintaining the two legs in the expanded, in use configuration during use.

14. A rifle comprising the rest of claim 1 or the rest stand of claim 11.

15. A rest stand for attachment to a rifle and resting on a surface, wherein the rest stand comprises a support body, at least two legs which are supported by the support body and a fixture coupling which includes a magnetic element for removable attachment to a stand coupling on the rifle, wherein the at least two legs are each pivotably coupled to the support body about a respective pivot between a first, expanded or in use configuration and a collapsed configuration, the at least two legs each include a pivot connector at one, upper end thereof which is pivotably coupled to the support body, the support body includes first and second magnetic elements, each adjacent to a respective outer side of one the pivots, and the pivot connectors each include a magnetic element, whereby the magnetic element of the pivot connector of the respective leg is attracted to the respective magnetic element of the support body, thereby maintaining the legs in the expanded, in use configuration during use, wherein the fixture coupling and the stand coupling each comprise circular or near circular sections mated at a flat plane, which provide for smooth, substantially planar rotation of the fixture coupling in relation to the stand coupling around a vertical axis and also allows for rotation of the rifle about a horizontal axis; and wherein the stand coupling allows for a smooth rotation of the rifle about the rest stand when planted on a surface.

16. A bi-pod rifle rest, comprising:
a rifle fixture which is in use attached to a rifle, wherein the rifle fixture comprises a stand coupling which includes a magnetic element for removable attachment of a rest stand; and
a rest stand for resting on a surface, wherein the rest stand comprises a support body, first and second legs which are supported by the support body and a rifle coupling which includes a magnetic element for removable attachment to the stand coupling on the rifle;
wherein the stand coupling and the rifle coupling each comprise circular or near circular sections mated about a flat plane, which provide for smooth, substantially planar rotation of the fixture coupling in relation to the stand coupling around a vertical axis and also allows for rotation of the rifle about a horizontal axis through a centerline of the support body.

* * * * *